United States Patent [19]

Buscher et al.

[11] 3,944,974
[45] Mar. 16, 1976

[54] DIGITAL SIGNAL SELECTOR DEVICE

[75] Inventors: Richard George Buscher, Woodland Hills; Gunnar M. Soderlund, Los Angeles, both of Calif.

[73] Assignee: Lear Siegler, Inc., Santa Monica, Calif.

[22] Filed: Dec. 26, 1974

[21] Appl. No.: 536,360

[52] U.S. Cl. .................. 340/146.1 BE; 235/153 AE
[51] Int. Cl.² ......................................... G06F 11/00
[58] Field of Search ..... 340/146.1 BE; 235/153 AE, 235/150.2; 244/77 R, 77 M; 307/219

[56] References Cited
UNITED STATES PATENTS

| | | | |
|---|---|---|---|
| 3,444,516 | 5/1969 | Lechleider | 340/146.1 BE |
| 3,538,498 | 11/1970 | Games et al. | 340/146.1 BE |
| 3,544,778 | 12/1970 | Masters, Jr. | 235/153 AE |
| 3,670,148 | 6/1972 | Moses | 235/150.2 |
| 3,686,493 | 8/1972 | Schmid | 340/146.1 BE |
| 3,697,776 | 10/1972 | Matejka | 307/219 |
| 3,805,235 | 4/1974 | Foster et al. | 340/146.1 BE |

*Primary Examiner*—Charles E. Atkinson
*Attorney, Agent, or Firm*—Ralph B. Pastoriza

[57] ABSTRACT

The device is arranged to receive a plurality of separate groups of signals, each group including a given number of redundant digital signals and is to select one of the digital signals from each group for subsequent processing. Memory sections are provided for storing at specific locations in each of the sections the digital signals of the various groups. A clock and counter are used to control an addressing circuit for cycling the addressing of the respective sections and locations such that the digital signals in each group may be successively stored in suitable buffer registers on a time share basis. The redundant signals in each group are then successively released for independent analysis, a preferred or favored digital signal among the redundant signals being selected and stored in a high speed memory section. These stored preferred signals from each of the groups are then available for subsequent processing.

4 Claims, 4 Drawing Figures

DIGITAL SIGNAL SELECTOR DEVICE

This invention relates generally to digital signal processing operations and more particularly to a special purpose digital signal selector device for use in systems wherein a plurality of groups, each made up of a number of redundant digital signals, are provided and it is desirable to utilize only preferred ones of the digital signals in each of the groups to perform desired operations.

BACKGROUND OF THE INVENTION

There are many systems in which redundant digital signals are provided, primarily for safety reasons. For example, in aircraft, the control surfaces are usually moved by servo motors in turn controlled by command signals generated in response to the pilot's movement of the pitch, roll and yaw controls in the cockpit. Thus, when the pilot pulls back on the pitch controller to operate the aircraft tail elevators, this movement might be sensed by four individual sensors to provide four redundant signals. This set of signals is then read into a processor which must, through software control, perform a signal selection logic to provide a preferred signal from the redundant signals as the actual command signal. Second and third groups each comprising a given number of redundant signals for different operations such as roll control, yaw control, etc. similarly require processing, the actual signal selection logic portion constituting a repetitive operation.

The basic disadvantage of the foregoing arrangement in the example of aircraft is the amount of processor time that is required to perform the signal selection. It would be far more advantageous to provide a special purpose device for use in such redundant systems for selecting one of the redundant signals prior to actual processing by the main digital processor equipment on the aircraft or even after processing of the signals. The primary advantage would be the reduction in the computation load of the main digital processore.

It should be understood that such a device would not be limited to use in aircraft control systems but would have application in any system wherein groups each made up of sets of redundant signals are provided and wherein it is necessary to select a preferred one of the redundant signals in each group for subsequent operations.

BRIEF DESCRIPTION OF THE PRESENT INVENTION

In accord with the present invention, a special purpose digital signal selector device is connected to receive a plurality of separate groups of signals, each group including a given number of redundant digital signals, and to select one of the digital signals from each group for subsequent processing. Towards this end, the device includes a plurality of memory sections corresponding in number to the given number of digital signals, each section having a number of memory locations corresponding to the number of groups, connected respectively to receive and store the digital signals. A read only memory means unit connects to an address means responsive to the unit for successively addressing the memory locations. Buffer register means corresponding to the given number of digital signals in each group, in turn are connected to the output of the address means. The control of the address means and read only memory means is accomplidhed by a clock means which cycles the address means such that the digital signals in each group may be successively stored in the buffer register means on a time share basis.

The device is completed by the provision of a comparator and selection means connected to the buffer register means for comparing and selecting a preferred one of the digital signals from a group stored therein, the same comparator and selection means then selecting a preferred one of the digital signals in the next group stored in the buffer register means, and so forth, all under control of the clock means. The selected ones of the digital signals from each group may then be stored in a high speed memory section so that the selected signals are available for subsequent processing or, in the event that the special purpose device is used after a digital processing operation, the preferred or selected signals are available for immediate conversion to analog signals to thereby perform direct command functions.

By utilizing such a device in a manner to either pre-process or post-process data, the computation load of a main digital processor which uses the selected data is vastly reduced.

BRIEF DESCRIPTION OF THE DRAWINGS

A better understanding of this invention will be had by now referring to the accompanying drawings in which.

DETAILED DESCRIPTION OF THE INVENTION

Figure 1:
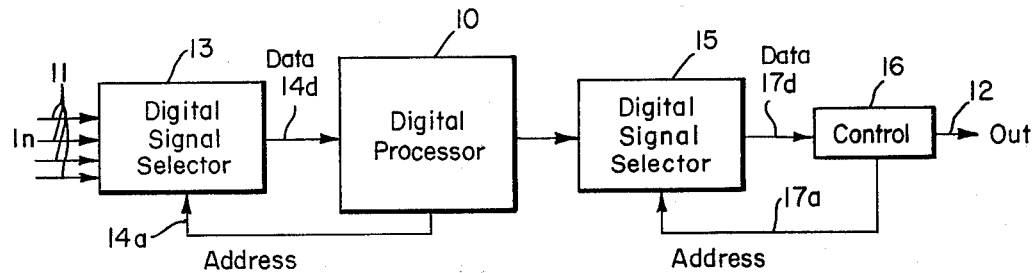
FIG. 1 illustrates in simplified block form a basic system utilizing a digital processor wherein the special purpose digital signal selector device of this invention may be utilized either or both in a pre-selection or post-selection of preferred digital signals among redundant signals.

Referring first to FIG. 1 there is shown a general purpose digital processor 10 which might, by way of example, be employed on an aircraft for processing digital signals generated in response to pilot commands for controlling the aircraft surfaces. As mentioned heretofore, part of the circuitry of the digital processor 10 would be required to perform a selection among groups of redundant digital signals received on input lines 11, the selected or preferred signal then passing from an output line 12.

In accord with the present invention, there is provided a special purpose digital signal selector device for performing this particular selection operation all to the end that the load on the main digital processor 10 can be greatly reduced. Such device is indicated by the block 13 for receiving the groups of redundant signals at 11 and subsequently making available to the digital processor only the preferred selected digital signals from among the redundant signals in each group. A data line 14d provides the selected signals to the digital processor 10.

Also shown in FIG. 1 is a second special purpose digital signal selector device 15 which may be provided to perform a similar function in the event that redundant signals are also provided from the output of the digital processor 10. A control 16 and data line 17d selects the preferred signals made available by the digital signal selector device 15 for providing the finally selected output signals on line 12. Address lines 14a and 17a connect to the devices as shown.

The purpose of FIG. 1 is simply to illustrate the fact that the special purpose digital signal selector of the present invention can be used in either a pre-processing or post-processing position or in certain systems in both positions.

Figure 2:
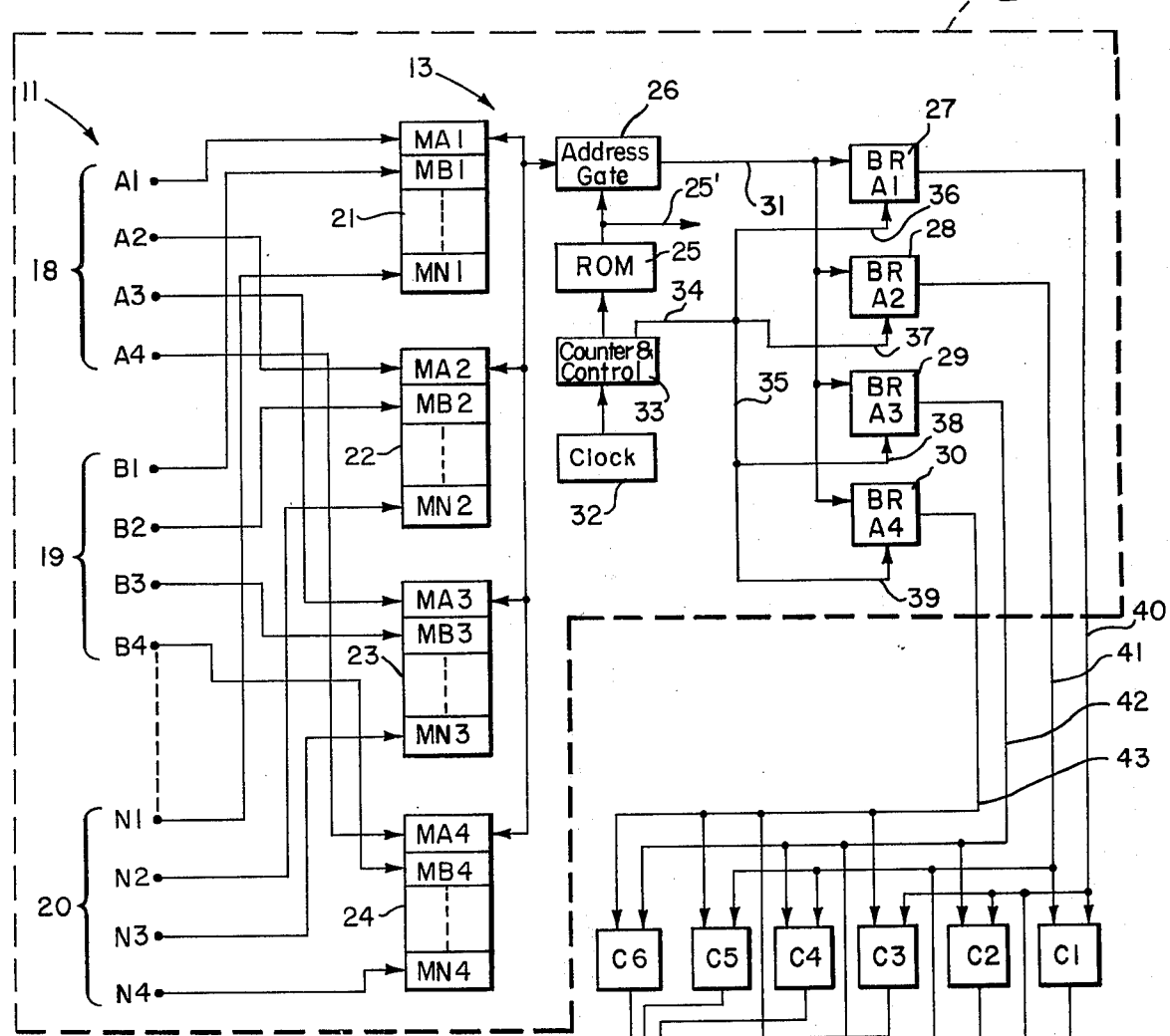
FIGS. 2, 3 and 4 show more detailed block diagrams of three examples of the special purpose digital signal selector device itself.
Figure 2:
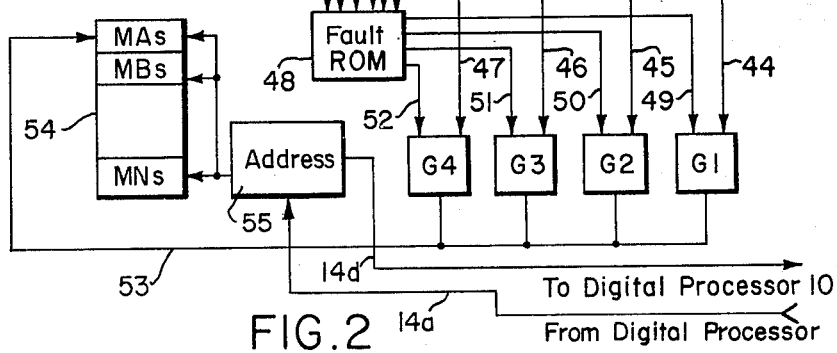

Referring now to FIG. 2, details of a first type of the special purpose device will be described. Since the devices 13 and 15 described in FIG. 1 are essentially the same, it will be understood that the device shown in FIG. 2 will apply to either of the devices of FIG. 1.

Referring to the left portion of FIG. 2, the various groups of redundant signals on the line 11 are shown at 18, 19 and 20. Actually, the plurality of groups may be any number N, each group itself comprising a given number of redundant digital signals. In the particular example illustrated, the given number of signals in each group is four, the redundant signals in the first group being indicated at A1, A2, A3 and A4. Similarly, the four redundant signals in the second group 19 are indicated B1, B2, B3 and B4, and so forth to the $N^{th}$ group 20 wherein the redundant signals are indicated at N1, N2 N3 and N4. While the given number of redundant signals is four, it will be understood that such number could be 2, 3, or any greater number than four.

The device itself as shown in FIG. 2 includes a plurality of memory sections designated 21, 22, 23 and 24. Generally, the total number of memory sections required corresponds to the total number of redundant signals in any one group. Since in the example set forth, there are four redundant signals in each group, there are provided four basic memory sections. Each of these sections, as indicated in the drawing, have a number of memory locations which number corresponds to the total number of groups. These memory locations, as shown, are connected to receive the various signals from the groups. Thus considering the memory section 21, it will include memory locations MA1 MB1, and so forth to the MN1. The first redundant digital signal from the group 18 designated A1 will be stored in memory section 21 at location MA1. The first redundant digital signal B1 from the second group 19 is stored in the second location MB1 of the memory section 21. Similarly, all of the other signals are stored in the sections and memory locations as indicated by the arrows.

A read only memory means 25 connects to an address gate means 26 in turn arranged to address the various locations in the memory sections to inputs of a number of buffer register means indicated by the blocks 27, 28, 29 and 30, again corresponding in number to the given number of redundant signals in any one group. The operation of the address gate means is sequential so that the digital code information is applied successively on the common output line 31 then into the appropriate buffer register so that the signals from 21, 22, 23, and 24 appear at buffers 27, 28, 29 and 30 in this sequence.

The foregoing storage of the digital signals in any one group in the buffer register means is accomplished by a clock means including a clock 32 and counter and controller 33 connected to control the read only memory means 25. The clock means causes a cycling of the address means such that the digital signals in each group may be successively stored in the buffer register means on a time share basis.

The foregoing operation is under control of control line 34 from the counter and controller 33 connecting to a common line 35. This common line has branch output lines 36, 37, 38 and 39 connecting to the buffer registers 27, 28, 29 and 30 respectively. Essentially, the counter and controller 33 control storage in and release from the buffer register means of the digital signals of a group for comparison and selection so that the buffer register means are available for storage of the digital signals from the next group in accord with the operation of the address means by the read only memory means and controlling clock means.

The above referred to comparator and selection means include a plurality of comparators designated by the blocks C1, C2, C3, C4, C5, and C6. Each of these comparators includes two inputs for receiving a pair of redundant signals from the particular group stored in the buffer register means for comparing the same. Thus, as shown in FIG. 2, the four outputs from the buffer registers on lines 40, 41, 42 and 43 are all applied to the comparator means. The connections are such, for example, that the redundant signals A1 and A2 from the buffer registers 27 and 28 appearing on output lines 40 and 41 are both passed to the two inputs of the comparator C1 for comparison with each other. In addition, the redundant signal A1 is also passed into comparator C2 for comparison with the redundant signal A3 appearing on output line 42. Comparator C3 in turn compares redundant signal A1 with redundant signal A4 on line 43. In a similar fashion and as is evident from the connections, comparator C4 compares redundant signals A2 and A3, comparator C5 compares redundant signals A2 and A4, and comparator C6 compares redundant signals A3 and A4. Thus, all of the signals are compared with each other in the comparator means.

The comparator and selection means also includes a number of gates corresponding to the given number of digital signals in each group. These gates are designated G1, G2, G3 and G4. First inputs to these gates respectively receive the redundant signals A1, A2, A3 and A4 from the output lines from the buffer registers by way of leads 44, 45, 46 and 47 respectively. A second read only memory means 48 containing the fault logic truth table is connected between the outputs of the various comparators and second inputs to the gates. Thus, there are shown second input connections 49, 50, 51 and 52 from the second ROM means 48. Essentially, the second ROM 48 will develop a signal on one only of the second input lines to the gates to thereby open one only of the gates and thus pass a preferred or selected digital signal applied to its other input. For example, assume that the signal A3 appearing at the first input of gate G3 is the favored or selected signal after analysis of the outputs from the variuos comparators C1 through C6 by the ROM means 48. If such is the case, a signal will be applied to the second input of gate G3 on lead 51 to thereby open the gate and pass this preferred signal to a common output line 53 for the various gates. The remaining digital signals will be blocked by the other gates.

As shown at the lower portion of FIG. 2, the preferred selected digital signal appearing on line 53 will then be stored in a high speed memory section 54. This storage is indicated at a location MAs indicating the slected one of the A signals.

It will be understood that the same process is carried out for the group of B signals, these signals next being stored in the buffer registers 27 through 30. The selected one of the B signals on the time sharing basis under control of the clock means is then stored in the high speed memory section 54 as indicated at MBs. The process continues as the clock means cycles through until the last preferred signals MNs is stored in the high speed memory 54.

The preferred selected signals from the various groups are thus available in the high speed memory 54 for subsequent processing such as by the digital processor 10 of FIG. 1. Towards this end, there is provided an address means 55 connected to the high speed memory section 54 for passing the selected signals along the data line 14d to the digital processor 10 when requested by the processor 55 on address line 14a.

It will be appreciated from the foregoing description that the same buffer registers, comparators, computer, and gates can be utilized successively to process signals from the different groups through a total of N groups. This is accomplished by the time sharing technique described in conjunction with the clock means and the read only memory and address circuits in conjunction with the memory storage sections.

Figure 3:
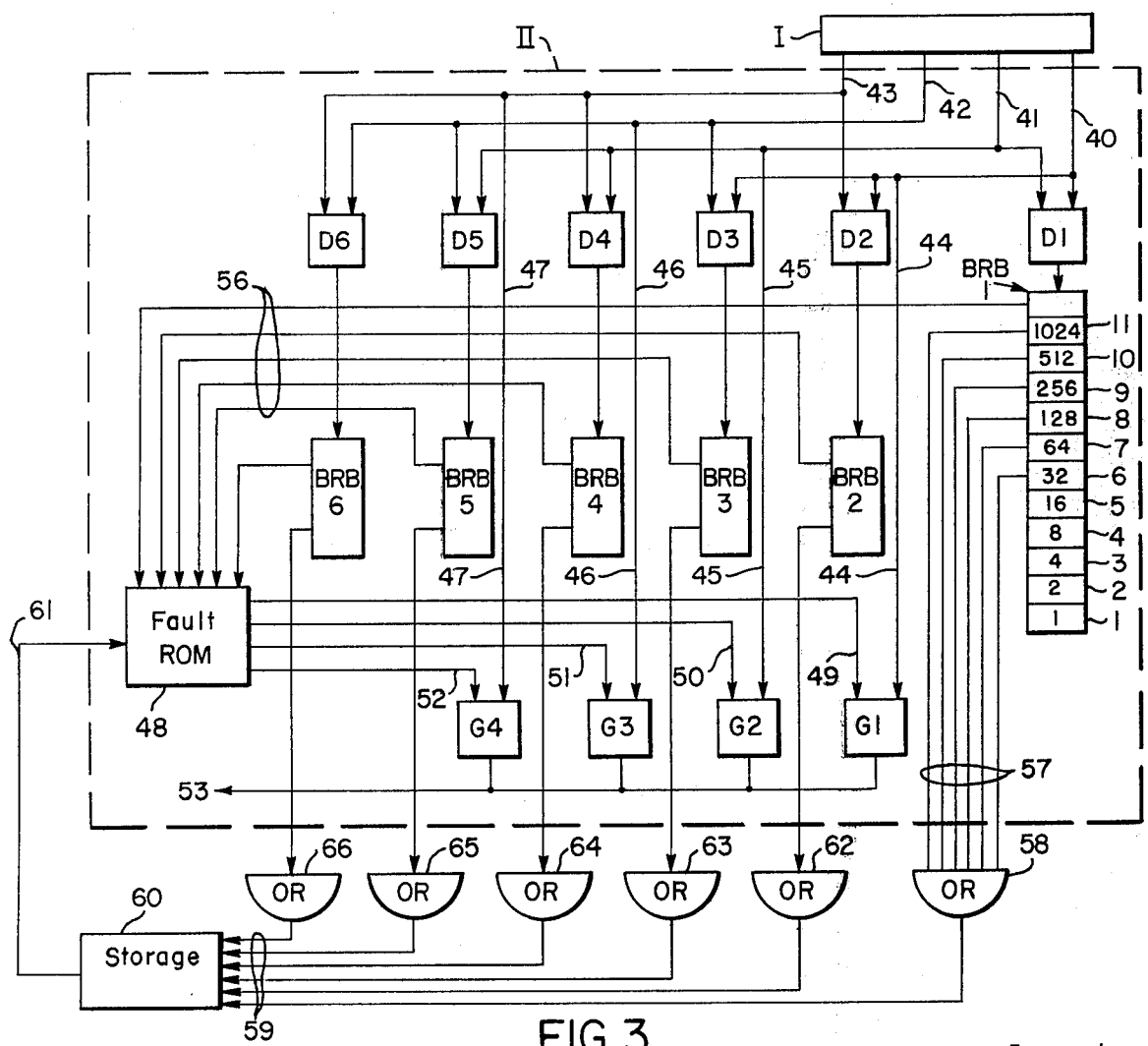

Referring now to FIG. 3, there is shown a refinement to the circuit of FIG. 2 which in essence provides a signal to the fault read only memory means 48 of FIG. 2 in the event that one or more of the redundant signals deviates from the others by more than a given percent. With such an arrangement, the fault read only memory 48 after being "advised" of such a signal, no longer need consider it in making the proper selection.

Referring to the upper portion of FIG. 3, the block I represents all of the circuitry enclosed within the dashed line I in FIG. 2, the leads 40, 41, 42 and 43 extending from the block I of FIG. 3 corresponding to the same output lines from the buffer registers designated by the same numerals in FIG. 2.

Rather than pass these output redundant signals into the comparators C1 through C6 as described in FIG. 2, they are instead passed through difference type comparators which in essence provide an output signal constituting a function of the exact difference between the two input signals. These difference circuits are indicated by the block D1, D2, D3, D4, D5 and D6, and their first and second inputs are respectively connected to the leads 40 through 43 in the same manner as the first and second inputs of the comparator circuits C1 through C6 of FIG. 2.

Thus, with the foregoing arrangement, the difference circuit D1 will provide an output signal constituting a function of the difference between the redundant signals A1 and A2 rather than a mere indication as to which one is larger than the other. Similarly, the difference circuits D2 through D6 will provide on their outputs signals which are functions of the difference between the input redundant signals thereto.

Rather than passing these outputs directly to the fault read only memory 48 as was done in FIG. 2, there are provided additional buffer register means which store bits of information. Thus, for the output of the difference circuit D1 there is shown connected thereto the buffer register designated BRB1. The remaining buffer registers BRB2, BRB3, BRB4, BRB5, and BRB6 similarly connect respectively to the outputs of the different circuits D2 through D6. Since the operation of these buffer register circuits is the same, a detailed description of the buffer register circuit BRB1 will suffice for all.

As shown in FIG. 3, the buffer register BRB1 stores essentially signal magnitudes from one through 1024 as powers of 2, so that essentially a comparision of from one to 1024 bits of information can be made with the incoming signal from the difference circuit D1.

An initial determination is made by the buffer register BRB1 when receiving the difference signal from the difference circuit D1 as to the sign of the signal; that is, plus or minus. This information is passed along an output line to the fault read only memory 48, the remaining buffer registers providing similar polarity signals to the fault read only memory 48, the various lines being collectively designated by the numeral 56. The fault read only memory 48 connects to second inputs of the gates G1 through G4 which are identical to the gates described in FIG. 2 to open one of these gates and pass the selected digital signal from one of the lines 44, 45, 46 or 47 passing into the first inputs of the gates. The selected signal is then passed on the lead 53 to the high speed memory 54 described in FIG. 2 and thus far the operation of FIG. 3 is the same as that of FIG. 2.

In addition to the foregoing, however, the difference signal is stored in the buffer register BRB1 and is inspected to determine the magnitude of the error. If a 1 rather than a 0 should appear, for example in the bit sections 6 through 11, it is known that the difference signal deviates from the selected value by more than a given per cent. Thus, if it is desired to eliminate a difference signal which deviates by more than 1 percent, any numeral 1 state of the bit sections 6 through 11 would indicate a deviation greater than 1 percent. If bit sections 5 through 11 were all analyzed and if any one of those contained a 1, the deviation would be greater than one-half per cent.

In the example illustrated, if the comparison results in less than 1 percent deviation, there will not appear any 1's on the bit sections 6 through 11. The outputs of these sections appear on leads 57 and pass to an OR circuit 58.

From the foregoing, it will be evident that should there be a 1 signal on any of the leads 57, indicating a deviation of greater than one per cent, a signal will appear at the output of the OR circuit 58 onto line 59 whence it is stored in a storage 60.

On the next cycling of the A1 through A4 redundant signals, the stored fault signal in the storage 60 will be passed through line 61 to the fault read only memory 48 and the particular signal in question will be entirely eliminated from the analysis so that only one of the three remaining redundant signals will be passed on the output lead 53.

It will be understood that similar detection of greater than one per cent or any other selected per cent deviation is applied to corresponding OR circuits on the leads 62, 63, 64, 65 and 66, corresponding to the collective leads 57 from the remaining buffer register blocks BRB2 through BRB6.

By the foregoing modification of the circuit of FIG. 2 as described in FIG. 3, it is possible to eliminate any one of the redundant signals which deviates beyond a selected per cent.

Figure 4:
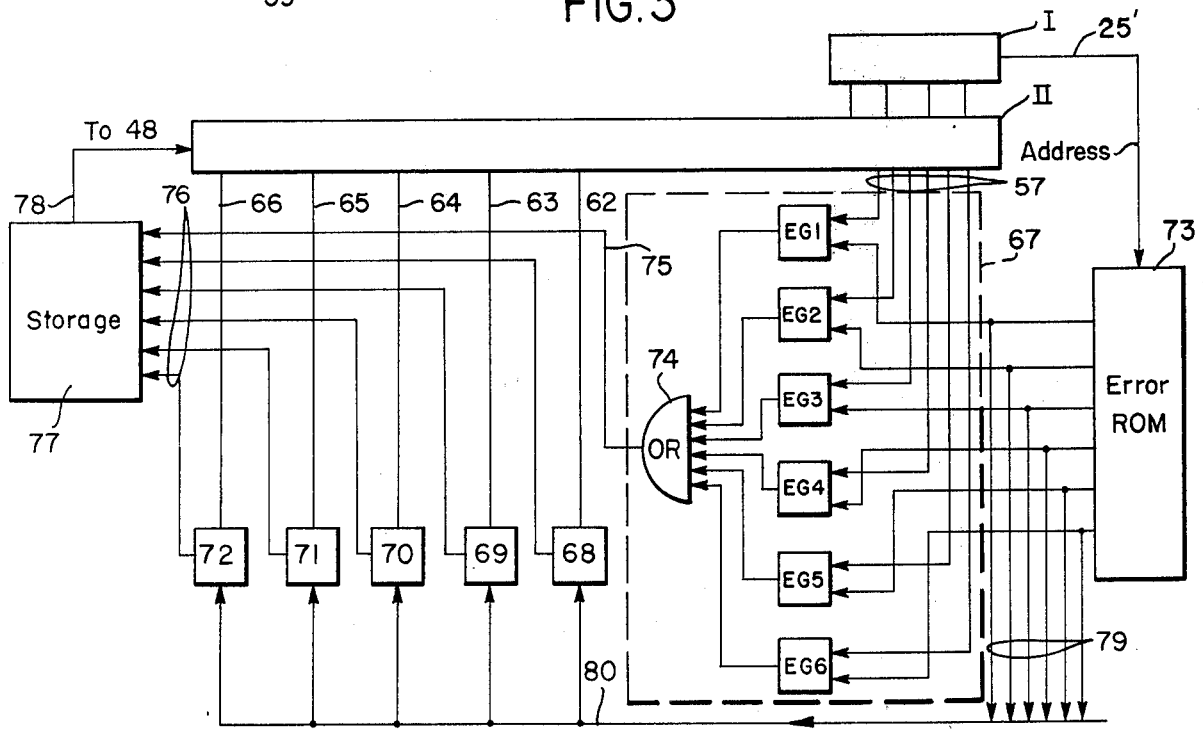

Referring now to FIG. 4, there is illustrated a still further modification of the basic circuits wherein it is possible to again eliminate any one signal from one of the groups of redundant signals if it deviates by a selected per cent but wherein different selected per cents of tolerable deviations of the respective groups of redundant signals cycled by the clock and counter control means described in FIG. 1 can be automatically incorporated.

For example, with the further modification of the circuit of FIG. 4, rather than simply eliminate any signal of the various groups of redundant signals which deviates by more than a given per cent, it is possible to eliminate any signal in a first group such as the redundant signals A1 through A4 which deviates by one selected per cent and eliminate any signal in a second group such as the redundant signals B1 through B4 which deviates by another selected per cent, and so forth.

Referring to FIG. 4, the block I shown in the upper right hand corner corresponds again to the circuitry of FIG. 1 enclosed within the dashed line designated I, and the elongated block II corresponds to that portion of the circuitry of FIG. 3 enclosed within the dashed line II. Thus, the same circuitry of FIG. 3 is utilized except instead of passing the signals on lines 57 and the corresponding lines for the remaining buffer registers 62 through 66 through OR circuits, these signals are passed to per cent error control circuits 67, 68, 69, 70, 71 and 72. All of these control circuits are the same and thus a detailed description of one will suffice for all. In this respect, the control circuit receiving the signals on the lines 57 and designated 67 is enclosed within the dashed line in FIG. 4.

As shown, the collective leads 57 pass into first inputs of a plurality of gates designated EG1, EG2, EG3, EG4, EG5, and EG6. It should be understood that if further bit sections are used from the BRB1 register of FIG. 3, there would be correspondingly provided additional gates. Thus if the per cent deviation at which a signal would be rejected among the redundant A1 through A4 signals is to be one half per cent, then there would be provided an output from the bit section 5 of the BRB1 register in FIG. 3 and correspondingly, there would be provided an additional gate in the circuit 67 of FIG. 4. Actually, there could be provided eleven such gates for the one to 11 sections illustrated in FIG. 3.

The second inputs to the gates EG1 through EG6 are received from an error read only memory means shown by the block 73. This error read only memory means is fed by the branch line 25' from the address ROM 25 of FIG. 1 and functions to enable the gates when the group A1 through A4 of redundant signals are being processed. Any signal of this group which deviates by more than the particular selected per cent for the group is passed by an OR circuit 74 receiving the outputs from the various gates to a line 75 and thence to one of the inputs 76 to a storage 77. The information in the storage is then passed through lead 78 to the fault read only memory means 48 of the circuit of FIG. 3 thereby eliminating that signal from subsequent analysis in the manner as described in FIG. 3.

The same error read only memory means 73 connects through branch leads 79 to a lead 80 collectively representing the branch leads 79 to the various other control circuits 68 through 72 receiving signals on the collective lines 62 through 66 as described in conjunction with FIG. 3 so that the gates in these latter control circuits are simultaneously energized for the group of redundant signals A1 through A4.

The address input to the error read only memory means 73 under control of the clock and counter as described in FIG. 1 will then gate the various control citcuits 67 through 72 for the next group of redundant signals B1 through B4 and thence the next group all the way through redundant signals N1 through N4. The output information is stored in the storage 77 as described in conjunction with the control circuit 67 and passed to the fault read only memory means 48 thus eliminating any signals in any one particular redundant group which deviates more than the particular percentage designated for that particular group.

It is thus possible, with the circuit of FIG. 4 to eliminate redundant signals in the group A1 through A4 which deviate by more than, for example, one per cent; eliminate redundant signals in the group B1 through B4 which deviate by more than, for example, ten per cent, and so forth for the remaining groups each being characterized by a selected per cent which may or may not be different from the percentage deviations permitted in the remaining gruops.

Since the components making up the digital signal selector such as designated by the block 13 in FIG. 1 are the same as those in the subsequently used digital signal selector shown by the block 15 in FIG. 1, it should be understood that a single digital signal selector could be utilized for both a preselecting and postselecting of the desired signals by suitable switching means. Further, while the particular system described in FIG. 2 refers to a sequential addressing of the various memory sections 21 through 24, it should be understood that by providing three additional address units, information may be supplied simultaneously; that is, in parallel to the buffer registers 27 through 30.

A further refinement in the circuitry of FIG. 3 is possible by utilizing the stored signal in the high speed memory section 54 of FIG. 2 for comparison with the signals received in the difference circuits D1 through D4. The arrangement is such that only four of the difference circuits may then be used.

From the foregoing description, it will thus be seen that a special purpose device as described in FIGS. 2, 3 and 4 provides the desired preferred signals of the redundant digital signals for further digital processing in the usual manner, all to the end that the main digital processor is not burdened with this function.

What is claimed is:

1. A special purpose digital signal selector device for receiving a plurality of separate groups of signals, each group including a given number of redundant digital signals, and selecting one of said digital signals from each group for subsequent processing, said device including, in combination:
   a. a plurality of memory sections corresponding in number to said given number of said digital signals, each section having a number of memory locations corresponding to the number of groups, a first memory location in each section being connected to receive and store respectively the redundant digital signals in a first group, a second memory location in each section being connected to receive and store the redundant digital signals in a next group, and so forth so that all of the signals in the plurality of separate groups of signals are stored;
   b. a read only memory means;
   c. address means responsive to said read only memory means connected to said memory sections for successively addressing the memory locations therein;
   d. a number of buffer register means corresponding to said given number of digital signals in each group respectively connected to the output of said address means;

e. clock means connected to said read only memory means for cycling said address means to transfer the digital signals in the first memory locations of said sections making up the first group of redundant digital signals for storage respectively in successive ones of said buffer register means so that a first buffer register means stores a first digital signal, a second buffer register means stores a second digital signal and so forth until all of the digital signals of said first group are stored;

f. comparator and selection means connected to said buffer register means for comparing and selecting a preferred one of the digital signals in the first group stored therein, said clock means and read only memory means cycling said address means to transfer the digital signals in the second memory locations of said sections making up the next group of redundant digital signals for storage in said buffer register means, said same comparator and selection means then selecting a preferred one of the digital signals in said next group stored in said buffer register means under control of said clock means; and g. a high speed memory section connected to the output of said comparator and selection means for storing the selected ones of said digital signals from each group whereby said selected signals are available for subsequent processing.

2. A device according to claim 1, including a controller means in said clock means connected to said buffer register means for controlling storage in and release from the buffer register means of the digital signals of a group for comparison and selection so that the buffer register means are available for storage of the digital signals from the next group in accord with the operation of said address means by said read only memory means and controlling clock means, said comparator and selection means including comparing means receiving and comparing the digital signals; a number of gates corresponding to said given number of digital signals in each group having first inputs connected to the outputs of said buffer register means respectively, and their outputs connected to a common line to said high speed memory section; and computer means connected to the second inputs of said gates and to the outputs of said comparator means and responsive to the comparator means to provide a signal to that gate associated with said preferred one of said signals as determined by said comparator means and computer means to pass the preferred signal to said high speed memory section, the other of the digital signals being blocked by the remaining gates.

3. A device according to claim 2, in which said comparing means provides output signals that are equal to the difference of the digital signals compared therein, said computer means including additional buffer register means receiving the difference signals from the comparing means and storing bits of information corresponding to a given signal magnitude for comparison with said difference signals, fault read only memory means for providing said signal to that gate associated with said preferred one of said signals, and OR circuit means connecting said additional buffer register means to said fault read only memory means, any signal received from any additional buffer register means which deviates from said given signal magnitude by more than a given per cent, being eliminated in said fault read only memory means.

4. A device according to claim 3, in which said OR circuit means includes additional circuit means connected between said additional buffer register means and said fault read only memory means wherein said given per cent of deviation from said given signal magnitude can be selected to have one value for one group of said digital signals and another value for a second group of said digital signals and so forth so that different tolerance levels can be established for the various groups of signals defining the deviation which must be exceeded to eliminate one or more redundant signals in each group.

* * * * *